United States Patent
Ke (10) Patent No.: US 9,535,534 B2
(45) Date of Patent: Jan. 3, 2017

(54) ELECTRONIC DEVICE AND CONTROL METHOD

(71) Applicant: Lenovo (Beijing) Co., Ltd., Beijing (CN)

(72) Inventor: Haibin Ke, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/208,535

(22) Filed: Mar. 13, 2014

(65) Prior Publication Data
US 2014/0267110 A1    Sep. 18, 2014

(30) Foreign Application Priority Data
Mar. 14, 2013    (CN) .......................... 2013 1 0081647

(51) Int. Cl.
*G06F 3/041*    (2006.01)
*G06F 3/048*    (2013.01)
*G06F 3/045*    (2006.01)

(52) U.S. Cl.
CPC ............. *G06F 3/0418* (2013.01); *G06F 3/045* (2013.01); *G06F 3/048* (2013.01); *G06F 2203/04809* (2013.01)

(58) Field of Classification Search
CPC ........................ G06F 3/016; G06F 2203/04809
See application file for complete search history.

(56) References Cited

U.S. PATENT DOCUMENTS

| 5,086,287 A * | 2/1992 | Nutzel | G09B 21/003 340/407.1 |
| 5,496,174 A * | 3/1996 | Garner | G09B 21/003 434/113 |
| 7,343,796 B2 * | 3/2008 | Drummond | A61M 16/20 417/413.2 |
| 7,567,243 B2 * | 7/2009 | Hayward | G06F 3/016 345/156 |

(Continued)

FOREIGN PATENT DOCUMENTS

| CN | 101506758 A | 8/2009 |
| CN | 102272959 A | 12/2011 |

OTHER PUBLICATIONS

First Chinese Office Action regarding Application No. 201310081647.7 dated Aug. 3, 2016. English translation provided by Unitalen Attorneys at Law.

*Primary Examiner* — Priyank Shah
(74) *Attorney, Agent, or Firm* — Harness, Dickey & Pierce, P.L.C.

(57) ABSTRACT

An electronic device and a control method are provided. The electronic device includes a display unit, a touch sensing unit, an adjustment unit and a controller. At least a first portion of the display unit is deformable, and the first portion deformed has a deformation distance with respect to a first side or a second side of a plane where the display unit is located. The adjustment unit triggers deformation of the first portion of the display unit. The controller determines a control button in display content and a display position of the control button on the first portion of the display unit, and controls the display unit to be deformed at the display position according to a predetermined deformation rule by means of the adjustment unit. The touch sensing unit detects contact information generated by touching the control button by a user.

15 Claims, 2 Drawing Sheets

(56) References Cited

U.S. PATENT DOCUMENTS

| | | | |
|---|---|---|---|
| 8,178,808 B2* | 5/2012 | Strittmatter | H01H 13/702 200/515 |
| 8,222,799 B2 | 7/2012 | Polyakov et al. | |
| 8,570,295 B2* | 10/2013 | Ciesla | G06F 3/0202 345/156 |
| 8,587,548 B2* | 11/2013 | Ciesla | G06F 3/016 345/156 |
| 8,704,790 B2* | 4/2014 | Ciesla | G06F 3/044 345/156 |
| 2002/0106614 A1* | 8/2002 | Prince | G09B 21/003 434/114 |
| 2004/0056876 A1* | 3/2004 | Nakajima | G06F 3/0488 715/702 |
| 2006/0214923 A1* | 9/2006 | Chiu | G06F 3/0202 345/173 |
| 2008/0248836 A1* | 10/2008 | Caine | G06F 1/1616 455/566 |
| 2009/0002205 A1* | 1/2009 | Klinghult | G06F 3/016 341/33 |
| 2009/0002328 A1* | 1/2009 | Ullrich | G06F 3/016 345/173 |
| 2009/0066672 A1* | 3/2009 | Tanabe | G06F 1/1626 345/176 |
| 2009/0207148 A1* | 8/2009 | Sugimoto | G06F 3/0418 345/173 |
| 2009/0250267 A1* | 10/2009 | Heubel et al. | 178/18.03 |
| 2010/0109486 A1 | 5/2010 | Polyakov et al. | |
| 2010/0162109 A1* | 6/2010 | Chatterjee | G06F 3/016 715/702 |
| 2010/0177050 A1* | 7/2010 | Heubel | G06F 3/0416 345/173 |
| 2010/0283727 A1* | 11/2010 | Jiang et al. | 345/156 |
| 2010/0315345 A1 | 12/2010 | Laitinen | |
| 2011/0018813 A1* | 1/2011 | Kruglick | G06F 3/016 345/173 |
| 2012/0032886 A1* | 2/2012 | Ciesla | G06F 3/016 345/168 |
| 2012/0086651 A1* | 4/2012 | Kwon | G06F 3/016 345/173 |
| 2012/0105333 A1* | 5/2012 | Maschmeyer | G06F 3/016 345/173 |
| 2012/0200528 A1* | 8/2012 | Ciesla | G06F 3/0202 345/174 |
| 2012/0218214 A1* | 8/2012 | Ciesla | G06F 1/1616 345/173 |
| 2012/0242607 A1* | 9/2012 | Ciesla | G06F 3/0202 345/173 |
| 2012/0299853 A1* | 11/2012 | Dagar | G06F 3/016 345/173 |
| 2012/0306787 A1* | 12/2012 | Ciesla | G06F 3/0202 345/173 |
| 2014/0062682 A1* | 3/2014 | Birnbaum | G08B 6/00 340/407.2 |
| 2014/0253687 A1* | 9/2014 | Lee et al. | 348/46 |

\* cited by examiner

ELECTRONIC DEVICE AND CONTROL METHOD

The present application claims the priority to Chinese Patent Application No. 201310081647.7, entitled "ELECTRONIC DEVICE AND CONTROL METHOD", filed on Mar. 14, 2013 with the Chinese State Intellectual Property Office, which is incorporated herein by reference in its entirety.

FIELD

The application relates to the field of electronic technology, and particularly to an electronic device and a control method.

BACKGROUND

With growing multimedia information queries, touch screen technology has been greatly developed, and devices with touch screens are widely used. A user can operate the device simply by lightly touching an icon or text on the touch screen with his/her finger.

However, a control corresponding to the icon or text is usually small if a large quantity of content is displayed on the touch screen. Hence, a mistake is prone to occur when the user touches the icon or text, resulting in inaccuracy in the touch control operation on the device.

SUMMARY

In view of the above, an electronic device and a control method are provided by the preset application, to solve the technical problem in the prior art that touch operations may not be performed accurately on the device due to many mistaken operations.

For the above-mentioned object, following technical solutions are provided by the preset application.

In one aspect of the application, an electronic device is provided, which includes a display unit, a touch sensing unit, an adjustment unit and a controller, where at least a first portion of the display unit is deformable, and the first portion deformed has a deformation distance with respect to a first side or a second side of a plane where the display unit is located;

the adjustment unit is configured to trigger deformation of the first portion of the display unit;

the controller is configured to determine a control button included in display content currently output by the display unit and a display position of the control button on the first portion of the display unit according to the display content, and to control the display unit to be deformed at the display position according to a predetermined deformation rule by means of the adjustment unit; and the touch sensing unit is configured to detect contact information generated by touching the control button by a user.

Preferably, the controller being configured to control the display unit to be deformed at the display position according to a predetermined deformation rule by means of the adjustment unit includes:

the controller being configured to determine a display type of the display content and a predetermined deformation rule corresponding to the display type, and control the display unit to be deformed at the display position according to the predetermined deformation rule by means of the adjustment unit.

Preferably, the controller being configured to control the display unit to be deformed at the display position according to a predetermined deformation rule by means of the adjustment unit includes:

the controller being configured to control the display unit to be deformed at different display positions by means of the adjustment unit in a case where a plurality of control buttons are detected, where deformation distances of the display unit at the different display positions with respect to the plane where the display unit is located include at least a first deformation distance and a second deformation distance, and the first deformation distance is different from the second deformation distance.

Preferably, the controller being configured to control the display unit to be deformed at different display positions by means of the adjustment unit includes:

the controller being configured to determine a control type of each control button and a deformation distance corresponding to each control type, and control the display unit to be deformed at the different display positions according to the deformation distances corresponding to the control types by means of the adjustment unit.

Preferably, the controller being configured to control the display unit to be deformed at the display position according to a predetermined deformation rule by means of the adjustment unit includes:

the controller being configured to control the display unit to be continuously changed at the display position between a first deformation state and a second deformation state by means of the adjustment unit, where the first deformation state is different from the second deformation state.

Preferably, the controller being configured to control the display unit to be continuously changed at the display position between a first deformation state and a second deformation state by means of the adjustment unit includes:

the controller being configured to determine a first change period during which the display unit changes from the first deformation state to the second deformation state and a second change period during which the display unit changes from the second deformation state to the first deformation state; and to control the display unit to be continuously changed at the display position between the first deformation state and the second deformation state by means of the adjustment unit, according to the first change period and the second change period.

Preferably, the controller being configured to determine a first change period during which the display unit changes from the first deformation state to the second deformation state and a second change period during which the display unit changes from the second deformation state to the first deformation state includes:

the controller being configured to determine the first change period during which the display unit changes from the first deformation state to the second deformation state and the second change period during which the display unit changes from the second deformation state to the first deformation state, according to the display content currently displayed by the display unit.

Preferably, the first deformation state is a state that the display unit has a third deformation distance at the display position with respect to the plane where the display unit is located, the second deformation state is a state that the display unit has a fourth deformation distance at the display position with respect to the plane where the display unit is located, and the third deformation distance is different from the fourth deformation distance.

Preferably, the first deformation state is a state that the display unit has a first cross sectional area at the display position, the second deformation state is a state that the display unit has a second cross sectional area at the display position, and the first cross sectional area is different from the second cross sectional area.

Preferably, the controller being configured to control the display unit to be deformed at the display position according to a predetermined deformation rule by means of the adjustment unit includes:

the controller being configured to control, by means of the adjustment unit, the display unit to be changed at the display position from the plane where the display unit is located to a plane which has a fifth deformation distance or a sixth deformation distance with respect to the plane where the display unit is located, where the fifth deformation distance is a deformation distance of the display unit with respect to the first side of the plane where the display unit is located and the sixth deformation distance is a deformation distance of the display unit with respect to the second side of the plane where the display unit is located.

Preferably, the adjustment unit includes a filling module and a deformation control module provided with control regions of different shapes, where the deformation control module is located between the touch sensing unit and the display unit, and different cavities are formed at locations corresponding to the different control regions;

the filling module is connected to the deformation control module, for filling the cavities corresponding to the different control regions with filler, to trigger deformation of the display unit at the locations corresponding to the different control regions; and where the controller being configured to determine a display position of the control button on the display unit and control the display unit to be deformed at the display position according to a predetermined deformation rule by means of the adjustment unit includes:

the controller being configured to determine the display position of the control button on the display unit and the control region corresponding to the display position, control the filling module to fill the cavity corresponding to the control region with the filler or control the filling module to draw the filler out of the cavity corresponding to the control region according to the predetermined deformation rule, to trigger deformation of the display unit at the locations corresponding to the different control regions.

In another aspect of the application, a control method is provided, which is applied to an electronic device, the electronic device includes a display unit, a touch sensing unit and an adjustment unit, at least a first portion of the display unit is deformable and the first portion deformed has a deformation distance with respect to a first side or a second side of a plane where the display unit is located, the method includes:

determining a control button included in display content currently output by the display unit and a display position of the control button on the first portion of the display unit according to the display content; and controlling the display unit to be deformed at the display position according to a predetermined deformation rule by means of the adjustment unit.

Preferably, the controlling the display unit to be deformed at the display position according to a predetermined deformation rule by means of the adjustment unit includes:

determining a display type of the display content and a predetermined deformation rule corresponding to the display type; and controlling the display unit to be deformed at the display position according to the predetermined deformation rule by means of the adjustment unit.

Preferably, the controlling the display unit to be deformed at the display position according to a predetermined deformation rule by means of the adjustment unit includes:

controlling the display unit to be deformed at different display positions by means of the adjustment unit in a case where a plurality of control buttons are detected, where deformation distances of the display unit at the different display positions with respect to the plane where the display unit is located include at least a first deformation distance and a second deformation distance, and the first deformation distance is different from the second deformation distance.

Preferably, the controlling the display unit to be deformed at different display positions by means of the adjustment unit includes:

determining a control type of each control button and a deformation distance corresponding to each control type; and controlling the display unit to be deformed at the different display positions according to the deformation distances corresponding to the control types by means of the adjustment unit.

Preferably, the controlling the display unit to be deformed at the display position according to a predetermined deformation rule by means of the adjustment unit includes:

controlling the display unit to be continuously changed at the display position between a first deformation state and a second deformation state by means of the adjustment unit, where the first deformation state is different from the second deformation state.

Preferably, the controlling the display unit to be continuously changed at the display position between a first deformation state and a second deformation state by means of the adjustment unit includes:

determining a first change period during which the display unit changes from the first deformation state to the second deformation state and a second change period during which the display unit changes from the second deformation state to the first deformation state; and controlling the display unit to be continuously changed at the display position between the first deformation state and the second deformation state by means of the adjustment unit, according to the first change period and the second change period.

Preferably, the controlling the display unit to be deformed at the display position according to a predetermined deformation rule by means of the adjustment unit includes:

controlling, by means of the adjustment unit, the display unit to be changed at the display position from the plane where the display unit is located to a plane which has a fifth deformation distance or a sixth deformation distance with respect to the plane where the display unit is located, where the fifth deformation distance is a deformation distance of the display unit with respect to the first side of the plane where the display unit is located and the sixth deformation distance is a deformation distance of the display unit with respect to the second side of the plane where the display unit is located.

According to the above-mentioned technical solution, an electronic device and a control method are provided by the preset application. The electronic device includes a touch sensing unit, an adjustment unit, a controller and a display unit, and at least a first portion of the display unit is deformable. The controller may determine a control button included in the display content on the display unit and a display position of the control button on the first portion of the display unit according to the display content, and the controller may control the display unit to be deformed at the display position corresponding to the control button by means of the adjustment unit. Therefore, compared with the prior art, the control buttons are easy to be found and distinguished, thereby improving the accuracy in selecting the control buttons and decreasing the mistaken operations, so that the touch control operation may be performed accurately on the device and the performance of the electronic device is improved.

BRIEF DESCRIPTION OF THE DRAWINGS

In order to more clearly illustrate the technical solutions of embodiments of the application or the prior art, accompanying drawings used in the description of the embodiments or the prior art are described below simply. Obviously, the accompanying drawings in the following description are only some embodiments of the application. Other drawings may be obtained by those skilled in the art without any creative work based on the accompanying drawings provided herein.

DETAILED DESCRIPTION

In the following, the technical solutions of the embodiments of the application are described clearly and completely in conjunction with the accompany drawings of the embodiments of the application. Obviously, the described embodiments are only part of embodiments of the application. All other embodiments obtained by those skilled in the art based on the embodiments of the application without any creative work belong to the scope of protection of the present application.

One concept of the application may be that, an electronic device includes a touch sensing unit, an adjustment unit, a controller and a display unit, at least a first portion of the display unit is deformable; the controller may determine a control button included in the display content on the display unit and a display position of the control button on the first portion of the display unit according to the display content, and the controller may control the display unit to be deformed at the display position corresponding to the control button by means of the adjustment unit. Therefore, the control buttons are easy to be found and distinguished, thereby improving the accuracy in selecting the control buttons and decreasing the mistaken operations, so that the touch control operation may be performed accurately on the device and the performance of the electronic device is improved.

The embodiments of the application are described in detail hereinafter in conjunction with the accompanying drawings.

Figure 1:
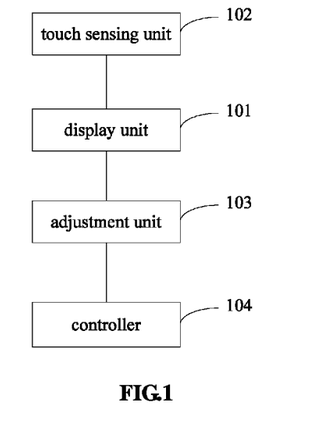
FIG. 1 is a schematic structural diagram of an electronic device according to an embodiment of the application.

FIG. 1 is a schematic structural diagram of an electronic device according to an embodiment of the application. The electronic device may include a display unit 101, a touch sensing unit 102, an adjustment unit 103 and a controller 104.

At least a first portion of the display unit 101 is deformable, and the first portion deformed has a deformation distance with respect to a first side or a second side of a plane where the display unit is located.

The display unit may have a deformation distance with respect to the first side or the second side of the plane where the display unit is located. That is, the plane where the display unit is located is taken as a reference plane, and the display unit may be deformed at a first side or a second side of the reference plane or at both the first side and the second side of the reference plane, to generate concavo-convex shapes.

The adjustment unit 103 is configured to trigger deformation of the first portion of the display unit 101.

The adjustment unit may trigger deformation of at least the first portion of the display unit. The adjustment unit may control the display unit to be deformed at a corresponding position according to a trigger instruction of the controller.

The controller 104 is configured to determine a control button included in the display content currently output by the display unit 101 and a display position of the control button on the first portion of the display unit 101 according to the display content, and control the display unit 101 to be deformed at the display position according to a predetermined deformation rule by means of the adjustment unit 103.

The touch sensing unit 102 is configured to detect contact information generated by touching the control button by a user.

When the electronic device outputs the display content by the display unit, the controller may determine whether a control button is included in the display content; and if it is, the controller may determine the display position of the control button on the first portion of the display unit, and may further control the display unit to be deformed at the display position of the control button according to a predetermined deformation rule by means of the adjustment unit.

The control button is a button in the display content which is capable of controlling the change of the display content, for example, various types of buttons displayed in the display content, such as a button for adjusting volume, a play/pause button or a selection button for a next song or a previous song displayed in a music play interface.

After the display unit is deformed at the display position of the control button, the position of the control button can be determined easily and quickly, and the touch and click operation can be performed at the position of the control button, then the touch sensing unit can detect contact information generated by touching the control button.

In practice, the display unit may be connected with the touch sensing unit. The display unit may be arranged at a first surface of the touch sensing unit, and the adjustment unit may be arranged at a second surface of the touch sensing unit. Alternatively, the adjustment unit may be arranged between the display unit and the touch sensing unit.

Figure 2:
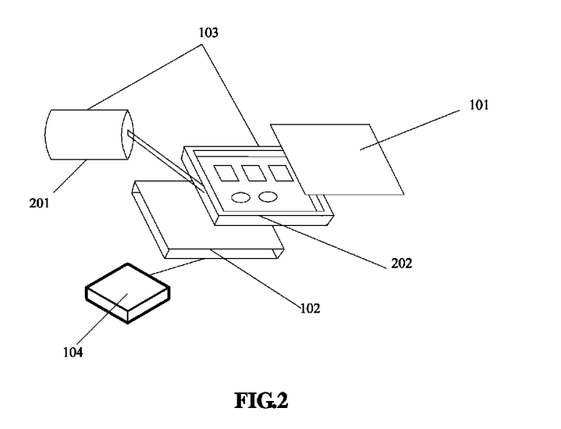
FIG. 2 is a schematic structural diagram of an electronic device according to another embodiment of the application.

The adjustment unit controls the first portion of the display unit to be deformed. As a possible implementation, FIG. 2 illustrates a schematic structural diagram of an electronic device according to another embodiment of the application. The electronic device includes a display unit 101, a touch sensing unit 102, an adjustment unit 103 and a controller 104, the function of each unit may refer to the above description. The adjustment unit 103 may include:

a filling module 201; and a deformation control module 202 provided with control regions of different shapes.

The deformation control module 202 is located between the touch sensing unit 102 and the display unit 101 and different cavities are formed at locations corresponding to the different control regions.

The filling module 201 is connected to the deformation control module 202, for filling the cavities corresponding to the different control regions with filler, to trigger deformation of the display unit at the locations corresponding to the different control regions.

The filler may be gas such as air. After the different control regions are filled with air, the display unit may be deformed at locations corresponding to the control regions due to the effect of the gas.

The first portion of the display unit is a portion corresponding to the different control regions.

The controller 104 is connected to the adjustment unit 103, the display unit 101 and the touch sensing unit 102. The controller 104 may determine, according to the display content currently output by the display unit 101, the control button included in the display content, the display position of the control button on the first portion of the display unit 101, and the control region corresponding to the display position; and may control the filling module 201 to fill the cavity corresponding to the control region with the filler or control the filling module 201 to draw the filler out of the cavity corresponding to the control region according to the predetermined deformation rule, to trigger deformation of the display unit at the locations corresponding to the different control regions.

Filling the cavity with the filler or drawing the filler out of the cavity may cause the display unit to have a deformation distance with respect to a first side or a second side of the plane where the display unit is located.

The deformation control module may include a holder and a backboard with different patterns, and the different patterns correspond to the different control regions. The holder and the backboard are combined together and arranged between the touch sensing unit and the display unit to form the cavities. In practice, the touch sensing unit may be a touch substrate, and the display unit may be formed of a display screen with an adhesive layer and may be deformable. The filling module may be connected with the deformation control module via a tube which may be arranged on the holder.

In the present embodiment, the electronic device includes a display unit at least a first portion of which is deformable, a controller, an adjustment unit and a touch sensing unit. The controller may determine, according to the display content on the display unit, the control button included in the display content and the display position of the control button on the first portion of the display unit, and the controller may control the display unit to be deformed at the display position corresponding to the control button by means of the adjustment unit. Therefore, the position of the control button can be determined easily and quickly, and the control button is distinguished from other display content, thus mistaken operations are avoided and the touch control operation can be performed accurately on the device.

In another embodiment of the application, there are multiple control buttons in the display content, and each of the control buttons corresponds to a display position on the first portion of the display unit. In this case, the controller may control the display unit to be deformed at different display positions by means of the adjustment unit. The deformation distances at the different display positions may be the same or may be different.

Therefore, the controller 104 controlling the display unit 101 to be deformed at the display position according to a predetermined deformation rule by means of the adjustment unit 103 may include:

controlling the display unit 101 to be deformed at different display positions by means of the adjustment unit 103 in a case where multiple control buttons are detected, where deformation distances of the display unit 101 at the different display positions with respect to the plane where the display unit is located include at least a first deformation distance and a second deformation distance, and the first deformation distance is different from the second deformation distance.

The different deformation distances may be used to effectively distinguish different control buttons, thereby allowing a user to find a corresponding control button quickly.

The deformation distance corresponding to the display position of each of the different control buttons may be determined based on the type of the control button. For example, for two control buttons that implement the same function but produce opposite effects, such as two control buttons that respectively control the volume to be increased and decreased, the display unit at the display position corresponding to the button that controls the volume to be increased may have a first deformation distance with respect to a first side of the plane where the display unit is located, and the display unit at the display position corresponding to the button that controls the volume to be decreased may have a second deformation distance with respect to the first side of the plane where the display unit is located, and the first deformation distance may be greater than the second deformation distance, so that the deformation distances at the display positions respectively corresponding to the two control buttons with opposite effects are different. Therefore, a user may distinguish different types of the control buttons according to the deformation distances when touching the two control buttons. Thus, the control buttons are easy to be found and distinguished, and particularly in a blind operation, it is able to determine the type of the control button based on the deformation distance.

The deformation distances of the display unit at the display positions of the different control buttons may include a deformation distance with respective to the first side of the plane where the display unit is located and a deformation distance with respective to a second side of the plane where the display unit is located, to form a concavo-convex shape. The user may also determine the different types of the control buttons based on the concavo-convex shape.

Thus, the controller controlling the display unit to be deformed at different display positions by means of the adjustment unit may include:

determining a control type of each control button and a deformation distance corresponding to each control type; and controlling the display unit to be deformed at different display positions by the deformation distance corresponding to the control type by means of the adjustment unit.

The deformation distance corresponding to each control type may be set in advance.

In controlling the display unit to be deformed at the different display positions by means of the adjustment unit, in addition to the deformation distance, the deformation may include a deformation area, i.e., a cross sectional area of the display unit at the display position. The cross sectional areas may include at least a third cross sectional area and a fourth cross sectional area which are different from each other.

In another embodiment of the present application, the predetermined deformation rule may be related to a display type of the display content, such as audio-related content of the display content, which may specifically be a music control interface displayed in the display content when music is played by the electronic device. Since music has a certain rhythm, the predetermined deformation rule may be a rule which is matched with the music rhythm. For example, the predetermined deformation rule is that: the display unit is continuously changed between two different deformation distances so that the deformation of the display unit may be matched with the music rhythm. Therefore, different deformation rules corresponding to different display types may be set in advance, and the controller 104 controlling the display unit 101 to be deformed at the display position according to a predetermined deformation rule by means of the adjustment unit 103 may include:

determining a display type of the display content and a predetermined deformation rule corresponding to the display type, and controlling the display unit 101 to be deformed at the display position according to the predetermined deformation rule by means of the adjustment unit 103.

The display position is a display position determined by the controller where the control button in the current display content is located on the first portion of the display unit.

If there are multiple control buttons corresponding to different display positions respectively, the controller may control the display unit to be deformed at the different display positions according to a predetermined deformation rule corresponding to the display type of the display content by means of the adjustment unit. The deformation distances at the different display positions may be predetermined according to the control type of the control button, thereby the controller may control the display unit to be deformed at the different display positions according to the deformation distance corresponding to the control type by means of the adjustment unit.

In another embodiment of the application, the controller 104 controlling the display unit 101 to be deformed at the display position according to a predetermined deformation rule by means of the adjustment unit 103 may include:

controlling the display unit 101 to be continuously changed at the display position between a first deformation state and a second deformation state by means of the adjustment unit 103, where the first deformation state is different from the second deformation state.

The predetermined deformation rule is a rule that the display unit is continuously changed at the display position between the first deformation state and the second deformation state.

The predetermined deformation rule may be a deformation rule corresponding to the display type of the current display content.

The first deformation state or the second deformation state is a specific state of the display unit after deformation. The display unit may be deformed at a first side or a second side of the plane where the display unit is located, or at both the first side and the second side.

In one possible implementation, the first deformation state may be a state that the display unit has a third deformation distance at the display position with respect to the plane where the display unit is located, the second deformation state may be a state that the display unit has a fourth deformation distance at the display position with respect to the plane where the display unit is located, and the third deformation distance is different from the fourth deformation distance.

That is, the controller may control the display unit to be continuously changed at the display position corresponding to the control button between a first deformation distance and a second deformation distance by means of the adjustment unit. The efficiency in finding and distinguishing the control buttons may be further improved by the continuous change.

In another case, the first deformation state may be a state that the display unit has a first cross sectional area at the display position, the second deformation state may be a state that the display unit has a second cross sectional area at the display position, and the first cross sectional area is different from the second cross sectional area.

That is, in addition to the deformation distance, the control button has different deformation area at the display position, and the deformation area may be indicated by the cross sectional area of the control button at the display position of the display unit. Thereby, the controller may control the display unit to be continuously changed at the display position between a first cross sectional area and a second cross sectional area by means of the adjustment unit.

The first deformation state may be a deformation state of the display unit at the first side with respect to the plane where the display unit is located, and the second deformation state may be a deformation state of the display unit at the second side with respect to the plane where the display unit is located. However, the application is not limited herein.

The controller 104 controlling the display unit 101 to be continuously changed at the display position between a first deformation state and a second deformation state by means of the adjustment unit 103 may include:

determining a first change period during which the display unit 101 changes from the first deformation state to the second deformation state and a second change period during which the display unit 101 changes from the second deformation state to the first deformation state; and controlling the display unit to be continuously changed at the display position between the first deformation state and the second deformation state by means of the adjustment unit 103, according to the first change period and the second change period.

The first change period and the second change period may be set according to the display state of the current display content on the display unit or the control type of the current control button. Thereby, by means of the adjustment unit, the controller may control the display unit to be changed at the display position from the first deformation state to the second deformation state during the first change period, and control the display unit to be changed at the display position from the second deformation state to the first deformation state during the second change period. Therefore, the user can determine the display state or the control type of the display content according to the deformation state of the control button at the display position.

For example, in a case where the display content output by the display unit is video content and the display content includes a control button for controlling the video, such as a play/pause button, the control button may be controlled to be continuously changed between the first deformation state and the second deformation state when the display state of the video content is a loading state, i.e., a state of acquiring video source from a server, so as to match the loading process of the video content. In practice, the control button may keep moving up and down at the display position, to prompt the user of the display state of current video content, i.e., the loading state.

In another embodiment, the controller 104 controlling the display unit 101 to be deformed at the display position according to a predetermined deformation rule by means of the adjustment unit 103 may include:

controlling, by means of the adjustment unit 103, the display unit 101 to be changed at the display position from the plane where the display unit is located to a plane which has a fifth deformation distance or a sixth deformation distance with respect to the plane where the display unit is located, where the fifth deformation distance is a deformation distance of the display unit with respect to the first side of the plane where the display unit is located, and the sixth deformation distance is a deformation distance of the display unit with respect to the second side of the plane where the display unit is located.

That is, in a practical application, the display unit at the display position corresponding to the control button may be convex or concave, and specifically, may be changed to locations corresponding to the fifth deformation distance or the sixth deformation distance. The predetermined deformation rule is also a rule that the display unit is changed at the position from a plane where the display unit is located to a plane which has a fifth deformation distance or a sixth deformation distance with respect to the plane where the display unit is located. The predetermined deformation rule may be a deformation rule corresponding to the display type of the current display content.

Specifically, controlling the display unit to be changed at the display position from a plane where the display unit is located to a plane which has a fifth deformation distance or a sixth deformation distance with respect to the plane where the display unit is located may include: controlling the display unit to be changed at the display position to a plane which has a fifth deformation distance with respect to the plane where the display unit is located during a third change period; or controlling the display unit to be changed at the display position to a plane which has a sixth deformation distance with respect to the plane where the display unit is located during a fourth change period. The third change period and the forth change period may be determined according to the display state of the display content or the type of the control button.

During the third change period or the forth change period, the cross sectional area of the control button at the display position may also be changed with the change of the deformation distance. As the deformation distance gradually becomes greater, the cross sectional area gradually becomes larger.

In a practical application, for example, in a case where the display content is video content, and the third change period or the forth change period is related with the loading time in a loading state, i.e., a state of acquiring video source from a server. The display unit has a fifth deformation distance or a sixth deformation distance after the loading is finished. Therefore, the control buttons are easy to be found and distinguished, and at the same time it is effective to prompt the user of the display state of the display content and an operation opportunity, i.e., the user can operate the control button when the deformation distance of the control button at the display position stops changing.

The deformation occurred at the display position may also be a deformation which is changed at the display position from the plane where the display unit is located to a plane which has a fifth deformation distance or a sixth deformation distance with respect to the plane where the display unit is located in a deformation rate. The deformation rate may also be determined based on the display state of the display content or the control type of the control button. Therefore, the user can be prompted of the display state of the display content and the operation opportunity.

In the embodiment of the application, the controller in the electronic device may control the display unit to be deformed at the position of the control button according to the predetermined deformation rule by means of the adjustment unit. The deformation may refer to the deformations described in the above embodiments. The control buttons are easy to be found and distinguished based on the display position of the control button after deformation, therefore, the accuracy in selecting the control buttons is increased, mistaken operations are decreased, and thus the performance of the electronic device is improved.

Figure 3:
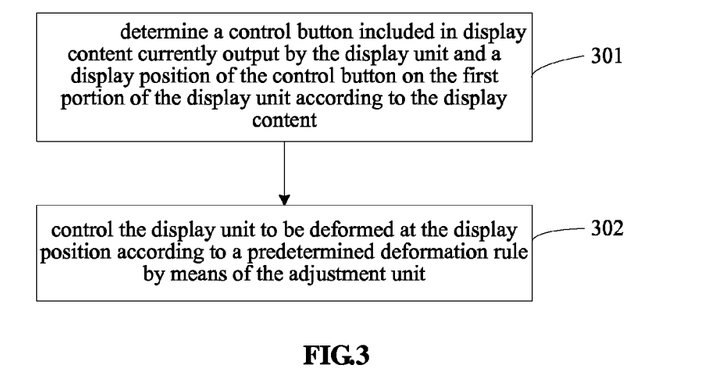
FIG. 3 is a flowchart of a control method according to an embodiment of the application.

A control method applied to the electronic device is further provided, which corresponds to the electronic device described in the above embodiment of the application. FIG. 3 illustrates a flowchart of a control method according to an embodiment of the application, the method is applied to an electronic device including a display unit, a touch sensing unit and an adjustment unit. At least a first portion of the display unit is deformable and the first portion deformed has a deformation distance with respect to a first side or a second side of a plane where the display unit is located. The method includes steps as follows.

A step 301 of, determining a control button included in display content currently output by the display unit and a display position of the control button on the first portion of the display unit according to the display content.

The control button is a button in the display content which is capable of controlling the change of the display content, for example, various types of buttons displayed in the display content, such as a button for adjusting volume, a play/pause button or a selection button for a next song or a previous song displayed in a music play interface.

A step 302 of, controlling the display unit to be deformed at the display position according to a predetermined deformation rule by means of the adjustment unit.

After the display unit is deformed at the display position of the control button, the position of the control button can be determined easily and quickly, and the touch and click operation can be performed at the position of the control button, then the touch sensing unit can detect contact information generated by touching the control button.

In one possible implementation, the controlling the display unit to be deformed at the display position according to a predetermined deformation rule by means of the adjustment unit may include:

determining a display type of the display content and a predetermined deformation rule corresponding to the display type; and controlling the display unit to be deformed at the display position according to the predetermined deformation rule by means of the adjustment unit.

That is, the predetermined deformation rule is related to the display type of the display content, and the display unit is controlled to be deformed according to the predetermined deformation rule corresponding to the display type.

In another possible implementation, there may be multiple control buttons, and the controlling the display unit to be deformed at the display position according to a predetermined deformation rule by means of the adjustment unit may include:

controlling the display unit to be deformed at different display positions by means of the adjustment unit in a case where multiple control buttons are detected, where deformation distances of the display unit at the different display positions with respect to the plane where the display unit is located includes at least a first deformation distance and a second deformation distance, and the first deformation distance is different from the second deformation distance.

The deformation of the display unit at the different display positions may be controlled according to the predetermined deformation rule corresponding to the display type of the current display content.

The deformation distance corresponding to the display positions of each of the different control buttons may be determined according to the type of the control button. For example, for two control buttons that implement the same function but produce opposite effects, such as two control buttons that respectively control the volume to be increased and decreased, the display unit at the display position corresponding to the button which controls the volume to be increased may have a deformation distance with respect to a first side of the plane where the display unit is located, and the display unit at the display position corresponding to the button which controls the volume to be decreased may have a deformation distance with respect to a second side of the plane where the display unit is located, thereby causing a concavo-convex shape at positions of the display unit where the two control buttons are located. Since the deformation distances at the display positions respectively corresponding to the two control buttons with opposite effects are different, the control buttons are easy to be found and distinguished, and particularly in a blind operation, it is able to determine the type of the control button based on the deformation distance. Therefore, the controlling the display unit to be deformed at different display positions by means of the adjustment unit may include:

determining a control type of each control button and a deformation distance corresponding to each control type; and controlling the display unit to be deformed at different display positions according to the deformation distance corresponding to the control type by means of the adjustment unit.

That is, if the control types of the control buttons are different, the deformation distances at the display positions respectively corresponding to the control buttons may be different. The deformation distances at the display positions respectively corresponding to the control buttons include at least a first deformation distance and a second deformation distance.

In controlling the display unit to be deformed at different display positions by means of the adjustment unit, in addition to the deformation distance, the deformation may include a deformation area, i.e., a cross sectional area of the display unit at the display position. The cross sectional areas include at least a third cross sectional area and a fourth cross sectional area which are different from each other.

In another possible implementation, the controlling the display unit to be deformed at the display position according to a predetermined deformation rule by means of the adjustment unit may include:

controlling, by means of the adjustment unit, the display unit to be changed at the display position from the plane where the display unit is located to a plane which has a fifth deformation distance or a sixth deformation distance with respect to the plane where the display unit is located, where the fifth deformation distance is a deformation distance of the display unit with respect to the first side of the plane where the display unit is located and the sixth deformation distance is a deformation distance of the display unit with respect to the second side of the plane where the display unit is located.

That is, in a practical application, the display unit at the display position corresponding to the control button may be convex or concave, and specifically, may be changed to locations corresponding to the fifth deformation distance or the sixth deformation distance, which may be determined according to the display type of the current display unit or the control type of the different control button.

In this embodiment, based on the display content on the display unit of the electronic device, the control button included in the display content and the display position of the control button on the first portion of the display unit may be determined, and the display unit may be controlled to be deformed at the display position corresponding to the control button by means of the adjustment unit. Therefore, the position of the control button can be determined easily and quickly, and the control buttons are distinguished from other display content, thus mistaken operations are avoided and the accuracy in the touch control operation is improved.

Figure 4:
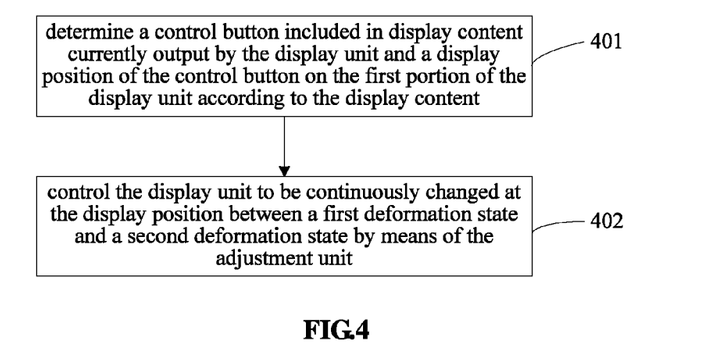
FIG. 4 is a flowchart of a control method according to another embodiment of the application.

FIG. 4 illustrates a flowchart of a control method according to another embodiment of the application. The method is applied to an electronic device including a display unit, a touch sensing unit and an adjustment unit. At least a first portion of the display unit is deformable, and the first portion deformed has a deformation distance with respect to a first side or a second side of a plane where the display unit is located. The method includes:

a step 401 of, determining a control button included in display content currently output by the display unit and a display position of the control button on the first portion of the display unit according to the display content; and a step 402 of, controlling the display unit to be continuously changed at the display position between a first deformation state and a second deformation state by means of the adjustment unit, where the first deformation state is different from the second deformation state.

The predetermined deformation rule may be a rule that the display unit is continuously changed at the display position between the first deformation state and the second deformation state.

The first deformation state or the second deformation state is a specific state of the display unit after deformation.

In one possible implementation, the first deformation state is a state that the display unit has a third deformation distance at the display position with respect to the plane where the display unit is located, the second deformation state is a state that the display unit has a fourth deformation distance at the display position with respect to the plane where the display unit is located, and the third deformation distance is different from the fourth deformation distance.

That is, in the embodiment, the display unit is controlled to be continuously changed at the display position corresponding to the control button between a first deformation distance and a second deformation distance by means of the adjustment unit. The efficiency in finding and distinguishing the control buttons is further improved by the continuous change.

In another implementation, the first deformation state may be a state that the display unit has a first cross sectional area at the display position, the second deformation state may be a state that the display unit has a second cross sectional area at the display position, and the first cross sectional area is different from the second cross sectional area.

That is, in addition to deformation distance, the control button has different deformation areas at the display position, and the deformation area may be indicated by the cross sectional area of the control button at the display position of the display unit. Thereby, the controller may control the display unit to be continuously changed at the display position between a first cross sectional area and a second cross sectional area by means of the adjustment unit.

The first deformation state may be a deformation state of a display unit at a first side with respect to the plane where the display unit is located, and the second deformation state may be a deformation state of the display unit at a second side with respect to the plane where the display unit is located. However, the application is not limited herein.

Specifically, the step 302 may include:

determining a first change period during which the display unit changes from the first deformation state to the second deformation state and a second change period during which the display unit changes from the second deformation state to the first deformation state; and controlling the display unit to be continuously changed at the display position between the first deformation state and the second deformation state by means of the adjustment unit, according to the first change period and the second change period.

The first change period and the second change period may be set according to the current display content on the display unit or the control type of the current control button. Thereby, by means of the adjustment unit, the controller may control the display unit to be changed at the display position from the first deformation state to the second deformation state during the first change period and control the display unit to be changed at the display position from the second deformation state to the first deformation state during the second change period.

With the continuous deformation at the display position of the control button, the efficiency in finding and distinguishing the control buttons is further improved, and the continuous deformation may be matched with the display content, which improves user's experience.

In the embodiment of the application, the display unit may be controlled to be deformed at the position of the control button according to a predetermined deformation rule by means of the adjustment unit. The deformation may refer to the deformation described in the above embodiments. The control buttons are easy to be found and distinguished based on the display position of the control button after deformation, therefore, the accuracy in selecting the control buttons is increased, the mistaken operations are decreased, and thus the performance of the electronic device is improved.

The embodiments are described in the specification in a progressive way, with emphasis of one embodiment on the difference from other embodiments. Therefore, one embodiment may refer to the same or similar parts of other embodiments. The description of the device embodiments corresponding to the method embodiments is relatively simple and the relevant portion thereof may refer to the explanation of the method.

The application can be implemented or used by those skilled in the art based on the above explanation of the disclosed embodiments. Numerous modifications to these embodiments will be apparent to those skilled in the art, and the general principle defined herein may be implemented in other embodiments without departing from the spirit and scope of the application. Accordingly, the application is not limited to these embodiments illustrated herein, but in accordance with the widest scope of the principle and novel features disclosed herein.

The invention claimed is:

1. An electronic device, comprising a display unit, a touch sensing unit, an adjustment unit and a controller,
    wherein at least a first portion of the display unit is deformable, and the first portion deformed has a deformation distance with respect to a first side or a second side of a plane where the display unit is located;
    the adjustment unit is configured to trigger deformation of the first portion of the display unit;
    the controller is configured to determine a control button comprised in display content currently output by the display unit and a display position of the control button on the first portion of the display unit according to the display content, and to control the display unit to be deformed at the display position of the control button on the first portion of the display unit according to a predetermined deformation rule by means of the adjustment unit; and
    the touch sensing unit is configured to detect contact information generated by touching the control button by a user;
    wherein the controller being configured to control the display unit to be deformed at the display position of the control button on the first portion of the display unit according to a predetermined deformation rule by means of the adjustment unit comprises:
        the controller being configured to determine a type of the display content and a predetermined deformation rule corresponding to the type of the display content, and control the display unit to be deformed at the display position of the control button on the first portion of the display unit according to the predetermined deformation rule by means of the adjustment unit; and
        the controller being configured to, in response to a plurality of control buttons being detected in the display content currently output by the display unit, control the display unit to be deformed at display positions of the plurality of control buttons with respect to said plane,
    wherein deformation distances of the display unit at the display positions of the plurality of control buttons with respect to said plane comprise at least:
        a first deformation distance at a first display position of a first control button; and
        a second deformation distance at a second display position of a second control button, and
    wherein the first control button and the second control button have opposite functions, and the first deformation distance is different from the second deformation distance.

2. The electronic device according to claim 1, wherein the controller being configured to control the display unit to be deformed at the display position of the control button on the first portion of the display unit according to a predetermined deformation rule by means of the adjustment unit comprises:
    the controller being configured to control the display unit to be continuously changed at the display position between a first deformation state and a second deformation state by means of the adjustment unit, wherein the first deformation state is different from the second deformation state.

3. The electronic device according to claim 2, wherein the controller being configured to control the display unit to be continuously changed at the display position between a first deformation state and a second deformation state by means of the adjustment unit comprises:

the controller being configured to determine a first change period during which the display unit changes from the first deformation state to the second deformation state and a second change period during which the display unit changes from the second deformation state to the first deformation state; and to control the display unit to be continuously changed at the display position between the first deformation state and the second deformation state by means of the adjustment unit, according to the first change period and the second change period.

4. The electronic device according to claim 3, wherein the controller being configured to determine the change period during which the display unit changes from the first deformation state to the second deformation state comprises:

the controller being configured to determine the first change period during which the display unit changes from the first deformation state to the second deformation state and the second change period during which the display unit changes from the second deformation state to the first deformation state, according to the display content currently displayed by the display unit.

5. The electronic device according to claim 3, wherein the first deformation state is a state that the display unit has a third deformation distance at the display position with respect to the plane where the display unit is located, the second deformation state is a state that the display unit has a fourth deformation distance at the display position with respect to the plane where the display unit is located, and the third deformation distance is different from the fourth deformation distance.

6. The electronic device according to claim 4, wherein the first deformation state is a state that the display unit has a third deformation distance at the display position with respect to the plane where the display unit is located, the second deformation state is a state that the display unit has a fourth deformation distance at the display position with respect to the plane where the display unit is located, and the third deformation distance is different from the fourth deformation distance.

7. The electronic device according to claim 3, wherein the first deformation state is a state that the display unit has a first cross sectional area at the display position, the second deformation state is a state that the display unit has a second cross sectional area at the display position, and the first cross sectional area is different from the second cross sectional area.

8. The electronic device according to claim 1, wherein the controller being configured to control the display unit to be deformed at the display position of the control button on the first portion of the display unit according to a predetermined deformation rule by means of the adjustment unit comprises:

the controller being configured to control, by means of the adjustment unit, the display unit to be changed at the display position of the control button on the first portion of the display unit from the plane where the display unit is located to a plane which has a fifth deformation distance or a sixth deformation distance with respect to the plane where the display unit is located, wherein the fifth deformation distance is a deformation distance of the display unit with respect to the first side of the plane where the display unit is located and the sixth deformation distance is a deformation distance of the display unit with respect to the second side of the plane where the display unit is located.

9. The electronic device according to claim 1, wherein the adjustment unit comprises a filling module and a deformation control module provided with control regions of different shapes, wherein the deformation control module is located between the touch sensing unit and the display unit, and different cavities are formed at locations corresponding to the different control regions;

the filling module is connected to the deformation control module, for filling the cavities corresponding to the different control regions with filler, to trigger deformation of the display unit at the locations corresponding to the different control regions; and wherein the controller being configured to determine a display position of the control button on the display unit and control the display unit to be deformed at the display position according to a predetermined deformation rule by means of the adjustment unit comprises:

the controller being configured to determine the display position of the control button on the display unit and the control region corresponding to the display position, control the filling module to fill the cavity corresponding to the control region with the filler or control the filling module to draw the filler out of the cavity corresponding to the control region according to the predetermined deformation rule, to trigger deformation of the display unit at the locations corresponding to the different control regions.

10. The electronic device according to claim 1, wherein the deformation distances of the display unit at the display positions of the plurality of control buttons with respect to said plane comprise at least three deformation distances different from each other.

11. A control method, which is applied to an electronic device, the electronic device comprising a display unit, a touch sensing unit and an adjustment unit, at least a first portion of the display unit being deformable and the first portion deformed having a deformation distance with respect to a first side or a second side of a plane where the display unit is located, wherein the method comprises:

determining a control button comprised in display content currently output by the display unit and a display position of the control button on the first portion of the display unit according to the display content; and controlling the display unit to be deformed at the display position of the control button on the first portion of the display unit according to a predetermined deformation rule by means of the adjustment unit;

wherein the controlling the display unit to be deformed at the display position of the control button on the first portion of the display unit according to a predetermined deformation rule by means of the adjustment unit comprises:

determining a type of the display content and a predetermined deformation rule corresponding to the type of the display content;

controlling the display unit to be deformed at the display position of the control button on the first portion of the display unit according to the predetermined deformation rule by means of the adjustment unit; and in response to a plurality of control buttons being detected in the display content currently output by the display unit, controlling the display unit to be deformed at display positions of the plurality of control buttons with respect to said plane, wherein deformation distances of the display unit at the display positions of the plurality of control buttons with respect to said plane comprise at least:

a first deformation distance at a first display position of a first control button; and a second deformation distance at a second display position of a second control button, and wherein the first control button and the second control button have opposite functions and the first deformation distance is different from the second deformation distance.

12. The method according to claim 11, wherein the controlling the display unit to be deformed at the display position of the control button on the first portion of the display unit according to a predetermined deformation rule by means of the adjustment unit comprises:

controlling the display unit to be continuously changed at the display position between a first deformation state and a second deformation state by means of the adjustment unit, wherein the first deformation state is different from the second deformation state.

13. The method according to claim 12, wherein the controlling the display unit to be continuously changed at the display position between a first deformation state and a second deformation state by means of the adjustment unit comprises:

determining a first change period during which the display unit changes from the first deformation state to the second deformation state and a second change period during which the display unit changes from the second deformation state to the first deformation state; and controlling the display unit to be continuously changed at the display position between the first deformation state and the second deformation state by means of the adjustment unit, according to the first change period and the second change period.

14. The method according to claim 11, wherein the controlling the display unit to be deformed at the display position of the control button on the first portion of the display unit according to a predetermined deformation rule by means of the adjustment unit comprises:

controlling, by means of the adjustment unit, the display unit to be changed at the display position of the control button on the first portion of the display unit from the plane where the display unit is located to a plane which has a fifth deformation distance or a sixth deformation distance with respect to the plane where the display unit is located, wherein the fifth deformation distance is a deformation distance of the display unit with respect to the first side of the plane where the display unit is located and the sixth deformation distance is a deformation distance of the display unit with respect to the second side of the plane where the display unit is located.

15. The method according to claim 11, wherein the deformation distances of the display unit at the display positions of the plurality of control buttons with respect to said plane comprise at least three deformation distances different from each other.

* * * * *